US007414990B2

(12) United States Patent
Gilliland et al.

(10) Patent No.: US 7,414,990 B2
(45) Date of Patent: Aug. 19, 2008

(54) METHOD AND SYSTEM FOR CONTROL OF CAPACITY IN A COMMUNICATION NETWORK

(75) Inventors: Dennis W. Gilliland, St. Charles, IL (US); Michael S. Witherell, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 429 days.

(21) Appl. No.: 10/952,362

(22) Filed: Sep. 28, 2004

(65) Prior Publication Data

US 2006/0067270 A1 Mar. 30, 2006

(51) Int. Cl.

*G08C 15/00* (2006.01)
*H04J 3/16* (2006.01)
*H04J 3/18* (2006.01)
*H04L 12/56* (2006.01)
*H04Q 7/20* (2006.01)

(52) U.S. Cl. ....................... 370/329; 370/235; 370/252; 370/468; 370/477; 370/395.2; 455/453; 455/450

(58) Field of Classification Search ... 455/452.1–452.2, 455/422.1, 423–425, 448–451, 453, 515–517, 455/550.1, 560–561, 556.2, 41.2; 370/229–235, 370/328–329, 338, 341, 251–252, 310, 253, 370/348–350, 395.2–395.21, 395.61, 395.64–395.65, 370/461–462, 465, 468–470, 477, 485–488, 370/902, 912; 709/221–222, 224, 228, 235; 725/93–97

See application file for complete search history.

(56) References Cited

U.S. PATENT DOCUMENTS 6,236,656 B1 * 5/2001 Westerberg et al. ...... 370/395.4
6,657,954 B1 * 12/2003 Bird et al. .................. 370/229
6,748,234 B1 6/2004 Agrawal et al.
6,985,752 B2 1/2006 Takano et al.
7,146,174 B2 * 12/2006 Gardner et al. ............. 455/453
7,193,966 B2 * 3/2007 Gupta et al. ............... 370/231
7,197,314 B2 * 3/2007 Soldani et al. ............. 455/450
2002/0173312 A1 11/2002 Takano et al.
2003/0123477 A1 7/2003 Gollamudi et al.

(Continued)

FOREIGN PATENT DOCUMENTS

EP 1215833 A1 6/2002

(Continued)

OTHER PUBLICATIONS

3GPP TS 25.401 3rd Generation Partnership Project; Technical Specification Group Radio Access Network; UTRAN Overall Des. 1999.

(Continued)

*Primary Examiner*—Meless N Zewdu

(57) ABSTRACT

A controller (103*a*, 103*b*) provides dynamic capacity, for use in connection with a communication network (101). A processor of the controller (103*a*, 103*b*) that can be utilized in the communication network can be configured to facilitate determining whether a current load level is below a predetermined low usage, and responsive thereto, adjusts a bearer configuration to allow higher throughput per user. Further, the processor (103*a*, 103*b*) can be configured to facilitate determining whether the current load level exceeds a predetermined high usage, and responsive thereto, adjusting the bearer configuration to allow lower throughput per user.

16 Claims, 3 Drawing Sheets

U.S. PATENT DOCUMENTS

| | | | | |
|---|---|---|---|---|
| 2004/0152422 | A1 | 8/2004 | Hoglund et al. | |
| 2004/0157618 | A1 | 8/2004 | Brouwer | |
| 2004/0166835 | A1 * | 8/2004 | Johansson et al. | 455/414.1 |
| 2004/0166899 | A1 | 8/2004 | Nakayasu | |
| 2005/0243752 | A1 * | 11/2005 | Brueck et al. | 370/317 |

FOREIGN PATENT DOCUMENTS

| | | | |
|---|---|---|---|
| WO | WO02091781 | A1 | 11/2002 |
| WO | WO03021976 | A1 | 3/2003 |
| WO | WO 03049319 | A1 | 6/2003 |

OTHER PUBLICATIONS

3rd Generation Partnership Project; Technical Specification Group Radio Access Network; UTRAN Overall Description; 1999(3GPPTS 25.40 V3.7.0.

Downlink Radio Resource Management Approach for 3G W-CDMA Networks (Sanchez-Gonzalez et al.) May 17-19, 2004, IEEE 59th Vehicular Technology Conference, VTC 2004-Spring (IEEE Cat. No. 04CH37514) vol. 4, pp. 1963-1967.

Basic Concenps of WCDMA Radio Access Network (Unknown), 2001, Ericsson Radio Systems AB 2001 AZ/LZT 123 6982.

* cited by examiner

METHOD AND SYSTEM FOR CONTROL OF CAPACITY IN A COMMUNICATION NETWORK

FIELD OF THE INVENTION

The present invention relates in general to wireless communication units and wireless networks, and more specifically to dynamically controlling capacity.

BACKGROUND OF THE INVENTION

In traditional communication networks, operators may be provided with an ability to make network configuration decisions to affect quality of service (QoS). Changes to the network configuration that affect QoS are static. Typically, the network configuration achieved thereby trades off capacity of the communication network for increased performance in connection with specific service types. For example, a relatively lower block error rate (BLER) can be set, configured, or targeted in the network configuration. This may result in higher throughput per user on a wireless data connection, but normally at the cost of reduced overall user capacity. Conversely, a higher configured BLER can be set or targeted by the network operator and this may increase the overall user capacity, but ordinarily at the cost of lower throughput per user.

Conventional network configuration techniques can be adequate in many situations, such as when the operator aspires to approach a particular QoS for users. A QoS in connection with particular aspects of the network may be called for in connection with, for example a commitment or guarantee to users.

A QoS guarantee does not necessarily imply that such service will be of a particularly high quality in certain other aspects. For example, TCP (transport control protocol) applications can suffer from a lower throughput when the BLER (block error rate) is high; TCP congestion procedures can be triggered due to the higher delay of UTRAN (universal terrestrial radio access network) RLC (radio link control) retransmissions on the air interface.

BRIEF DESCRIPTION OF THE DRAWINGS

The accompanying figures, where like reference numerals refer to identical or functionally similar elements and which together with the detailed description below are incorporated in and form part of the specification, serve to further illustrate a preferred embodiment and to explain various principles and advantages in accordance with the present invention.

DETAILED DESCRIPTION

Figure 1:
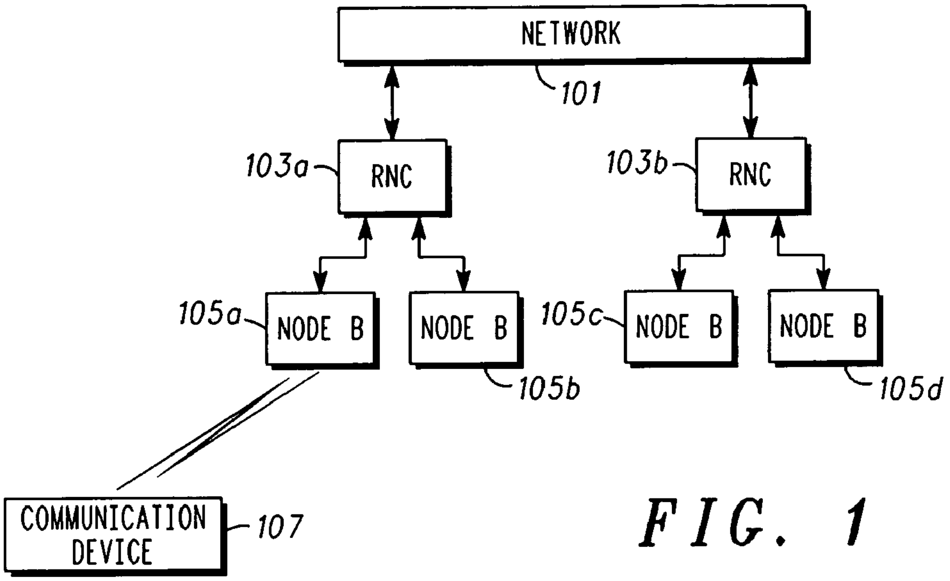
FIG. 1 is a diagram illustrating a simplified and representative environment associated with a communication unit and an exemplary portion of a communication network, e.g., a radio access network, in accordance with various exemplary embodiments.

In overview, the present disclosure concerns wireless communications systems and devices or units, often referred to as communication units, such as cellular phones or two-way radios and the like, typically having mobile operating capability, such as can be associated with a communication system such as an enterprise network, a cellular Radio Access Network, a third generation cellular system, or the like. Such communication systems may further provide services such as voice and data communications services. More particularly, various inventive concepts and principles are embodied in systems, communication units, and methods therein for controlling capacity of a communication network associated with a communication from a communication unit.

It should be noted that the term communication unit may be used interchangeably herein with subscriber unit, wireless subscriber unit, wireless subscriber device, user equipment or the like. Each of these terms denotes a device ordinarily associated with a user and typically a wireless mobile device that may be used with a public network, for example in accordance with a service agreement, or within a private network such as an enterprise network. Examples of such units include personal digital assistants, personal assignment pads, and personal computers equipped for wireless operation, a cellular handset or device, or equivalents thereof provided such units are arranged and constructed for operation in connection with communication networks.

The communication systems and communication units of particular interest are those providing or facilitating voice communications services or data or messaging services over cellular wide area networks (WANs), such as conventional two way systems and devices, various cellular phone systems including digital cellular, CDMA (code division multiple access) and variants thereof, GSM (Global System for Mobile Communications), GPRS (General Packet Radio System), 2.5G and 3G systems such as UMTS (Universal Mobile Telecommunication Service) systems, Internet Protocol (IP) Wireless Wide Area Networks like 802.16, 802.20 or Flarion, integrated digital enhanced networks and variants or evolutions thereof when dynamic tradeoffs, for example, between capacity and throughput are advantageous.

Furthermore the wireless communication units or devices of interest may have short range wireless communications capability normally referred to as WLAN (wireless local area network) capabilities, such as IEEE 802.11, Bluetooth, or Hiper-Lan and the like preferably using CDMA, frequency hopping, OFDM (orthogonal frequency division multiplexing) or TDMA (Time Division Multiple Access) access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System) or other protocol structures. Alternatively the wireless communication units or devices of interest may be connected to a LAN using protocols such as TCP/IP, UDP/UP, IPX/SPX, or Net BIOS via a hardwired interface such as a cable and/or a connector. The communication systems of interest support such communication devices and may benefit from the concepts and principles described below.

The present disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes and/or steps, which can be performed in any order, unless expressly and necessarily limited to a particular order; i.e. processes or steps that are not so limited may be performed in any order.

Much of the inventive functionality and many of the inventive principles when implemented, are best supported with or in software or integrated circuits (ICs), such as a digital signal processor or embedded systems and software therefore, or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

As further discussed herein below, various inventive principles and combinations thereof are advantageously employed to trade off or otherwise improve or optimize between capacity and quality of service (QoS) in a wireless communication system. For example, the capacity of a network can increase, optionally in a dynamic manner, while permitting an operator to keep a QoS within a specified range.

Current practice in 3G cellular networks is to provide an admission and load control procedure that can determine whether or not a new service request (e.g., a bearer request) can be honored in a specific cell. The admission and load control procedure can use conventionally measured information, for example, uplink interference, total received uplink power, total transmit carrier power, in connection with optional pre-specified computational algorithms in order to determine load leveling, thereby to determine whether or not to admit the new service request, e.g., to admit the new bearer.

Further in accordance with exemplary embodiments and advantageously, a bearer configuration can be controlled in consideration of, e.g., usage and throughput. For example, the bearer configuration can be controlled based on target BLER (block error rate) values and/or other values. The control can affect throughput, overall power requirements and/or interference conditions in a cell of the communication network, thereby increasing or decreasing an ability to admit or deny service requests, e.g., new users, optionally in a dynamic manner.

In accordance with one or more embodiments, communication network capacity and throughput per user are balanced, e.g., based on relevant conditions under the circumstances concerning the communication network. For example, one or more targets and thresholds for BLER can be provided for optional utilization in connection with affecting the network bearer configuration in various situations.

Advantageously, balancing of communication network capacity and per user throughput can permit higher throughput per user during low usage periods (in comparison to lower throughput per user during high usage periods); and can permit more users on the communication network (or portion thereof) during busy periods (in comparison to low numbers of users during quiet periods) at the possible cost of lower throughput per user for the busy periods. For example, controlling capacity by increasing target BLER values for a particular node on the communication network can reduce throughput for affected users on the particular node, reduce overall power requirements and interference conditions in the node, and permit the addition of new users to the node.

Referring now to FIG. 1, providing a dynamic capacity in connection with a communication network will be discussed and described. FIG. 1 is a diagram illustrating a simplified and representative environment associated with a communication device 107 and an exemplary portion of a communication network 101, e.g., in this example, a radio access network, in accordance with various exemplary embodiments. Also illustrated in the exemplary embodiments are radio network controllers (RNC) 103*a*, 103*b*, representative of any number of various controllers included in a communication network; and node B's 105*a*, 105*b*, 105*c*, 105*d*, representative of logical nodes in a portion of the communication network responsible for transmission and reception in one or more cells, to and from communication devices, e.g., the illustrated communication device 107. A node B, according to the "3$^{rd}$ Generation Partnership Project; Technical Specification Group Radio Access Network; UTRAN Overall Description (Release 1999)" can be defined as "a logical node in the RNS (radio network subsystem) responsible for radio transmission/reception in one or more cells to/from the UE (User Equipment)."

One or more of the controllers 103*a*, 103*b* of the network 101 can be utilized in connection with providing dynamic capacity for the communication network. Advantageously, processing described herein can be accomplished by the controllers 103*a*, 103*b*, for example, by one or more processors included therein. Although the illustrated exemplary embodiment included herein illustrates specific components, such as a separate communication network 101, separate RNC 103*a*, 103*b*, and separate logical nodes, e.g., node B's 105*a*, 105*b*, 105*c*, 105*d*, one or more embodiments and alternative exemplary embodiments contemplate that various functionalities described herein in connection with specific components and/or the components themselves can be combined, omitted, and/or distributed differently.

In accordance with exemplary and alternative exemplary embodiments, one or more of the controllers 103*a*, 103*b* can be configured to facilitate determining whether a current load level is below a predetermined low usage, and responsive thereto, adjusting a bearer configuration to allow higher throughput per user. The current load level can be obtained in accordance, for example, with known procedures by requesting information on the load level from, e.g., the node B's 105*a*, 105*b*, 105*c*, 105*d*. Known techniques provide for the controllers 103*a*, 103*b* to obtain measurements of relevant metrics from time-to-time and to periodically determine the load level. The predetermined low usage can be provided, for example, by various techniques, e.g., interaction with an operator. The bearer configuration can be adjusted, for example, via utilization of a known channel reconfiguration procedure, further in accordance with examples provided herein.

Also in accordance with exemplary and alternative exemplary embodiments, the controllers 103*a*, 103*b* can be configured to facilitate determining whether the current load level exceeds a predetermined high usage, and responsive thereto, adjusting the bearer configuration to allow lower throughput per user. The predetermined high usage can be provided, for example, by various techniques, e.g., interaction with an operator.

Further, according to one or more embodiments, the controller can facilitate adjusting the bearer configuration via one or more quality of service parameters. For example, in accordance with exemplary and alternative exemplary embodiments, adjusting can be accomplished via the BLER (block error rate). An example is further provided below illustrating determining, e.g., a BLER, a predetermined low usage, predetermined high usage, and lower/higher throughput per user.

One or more embodiments utilized in connection with providing a dynamic capacity in a communication network includes determining the ability of the system to service one or more bearers at the current load level; and responsive thereto, controlling a block error rate of a bearer configuration to adjust the throughput rate to the one or more bearers. The determination of the current load level can be performed, for example, in response to bearer requests, and/or on a periodic basis. The ability of a system to service a particular number of bearers at the current load level can be determined in accordance with, e.g., known techniques.

One or more controllers 103*a*, 103*b* provided in connection with one or more embodiments can receive a service request signal, e.g., a bearer request signal, directly or indirectly indicating that a new user requests a connection to the communication network 101, for example, via a particular node, e.g., one of the node B's 105*a*, 105*b*, 105*c*, 105*d*. One or more embodiments provide that the controller receiving the bearer request signal performs the previously described determination in response to the bearer request signal.

In accordance with one or more exemplary and alternative exemplary embodiments, the controllers 103*a*, 103*b* can monitor the load level, and can perform the previously described determination in response to the monitoring. For example, if the current load level changes from time-to-time, as determined by the monitoring, the previously described determination can be performed in response to a change in current load level.

In the specific illustration, the communication network 101 includes one or more controllers 103*a*, 103*b*, e.g., radio network controllers (RNC). The bearer configuration for the RNC can be adjusted in correspondence to a new bearer on the RNC, as previously described herein.

In accordance with one or more embodiments, the higher throughput per user utilized in connection with the foregoing can correspond to a lowest pre-determined block error rate. Further in accordance with one or more embodiments, a target for the block error rate can be calculated, and a lower throughput per user would normally correspond to the target block error rate that was calculated. An exemplary calculation of a target for the block error rate in accordance with one or more embodiments is provided in greater detail below.

In accordance with one or more embodiments, the determining of the ability of system operating at a current load level, to service one or more bearers, and/or the controlling of the bearer configuration to adjust the throughput rate for the one or more bearers, can be performed in one or more base transceiver station nodes that can communicate with the communication network 101. According to one or more exemplary and alternative embodiments, the determining and controlling can be performed in one or more mobile station nodes that can communicate with the communication network.

The throughput rate can be adjusted to allow higher throughput per user if the current load level is below a predetermined low usage; and/or can be adjusted to allow lower throughput per user if the current load level exceeds a predetermined high usage.

Figure 2:
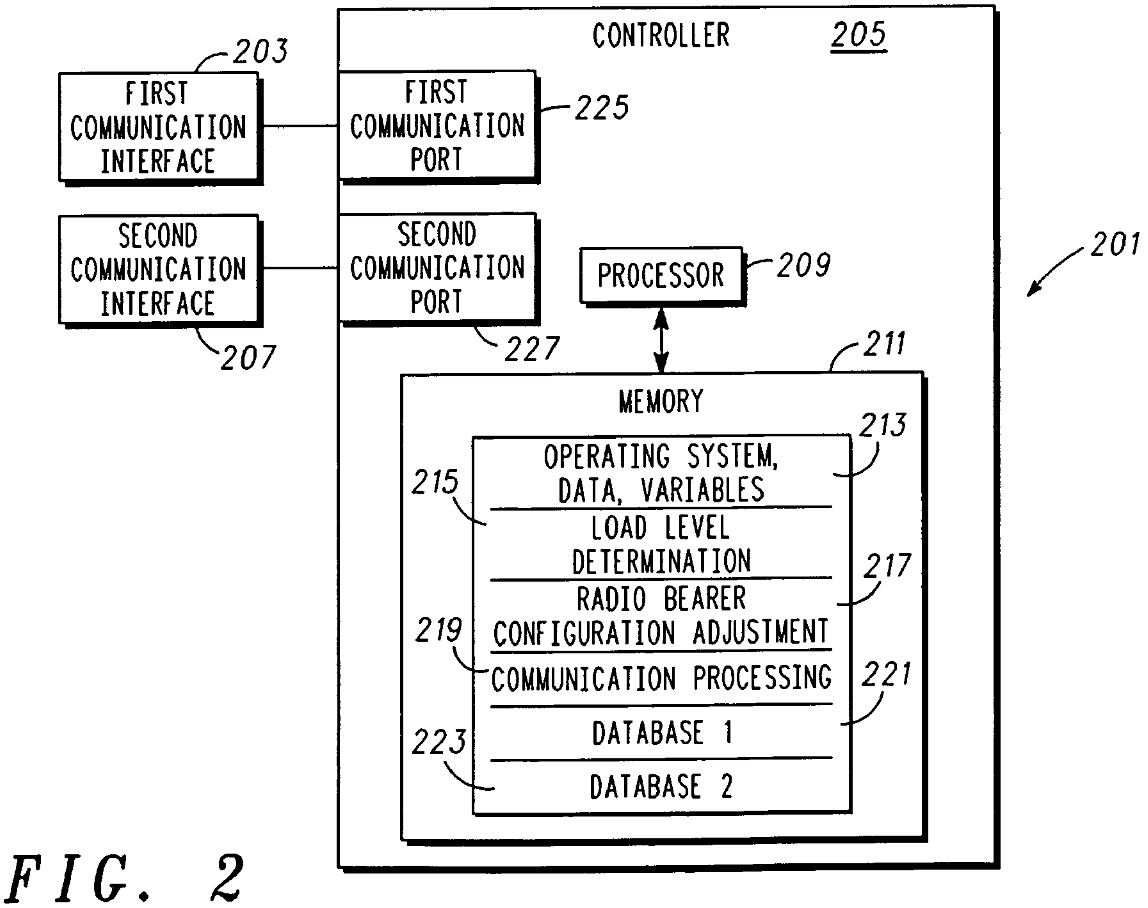
FIG. 2 is a diagram illustrating an exemplary controller in an exemplary network, e.g., a radio access network, arranged for controlling throughput in accordance with various exemplary embodiments.

Referring now to FIG. 2, a network controller 201 for use in connection with a network will be discussed and described. FIG. 2 is a diagram illustrating an exemplary network controller 201, such as controller 103*a*, 103*b* in an exemplary communication network, e.g., a radio access network arranged for controlling throughput in accordance with various exemplary embodiments. The network controller 201 may include a controller 205, a first communication port 225 for communicating with a first communication interface 203, and a second communication port 227 for communicating with a second communication interface 207. The controller 205 as depicted generally comprises a processor 209, a memory 211, and may include various other functionality that is not relevant but will be appreciated by those of ordinary skill.

The processor 209 may comprise one or more microprocessors and/or one or more digital signal processors. The memory 211 may be coupled to the processor 209 and may comprise one or more of a read-only memory (ROM), a random-access memory (RAM), a programmable ROM (PROM), an electrically erasable read-only memory (EEPROM) and/or magnetic memory or the like. The memory 211 may include multiple memory locations for storing, inter alia, an operating system, data and variables 213 for programs executed by the processor 209; computer programs for causing the processor to operate in connection with various functions such as load level determination 215, radio bearer configuration adjustment 217, and/or other processing such as communication processing 219; a database 221 of various parameters utilizing in controlling QoS (quality of service) and capacity; and a database 223 for other information used by the processor 209. The computer programs may be stored, for example, in ROM, PROM, etc. and can direct the processor 209 in controlling the operation of the communication controller.

Responsive to signaling received from the first communication port 225, the second communication port 227, or in accordance with instructions stored in memory 211, the processor 209 may handle communications, for example, a new bearer request.

Figure 3:
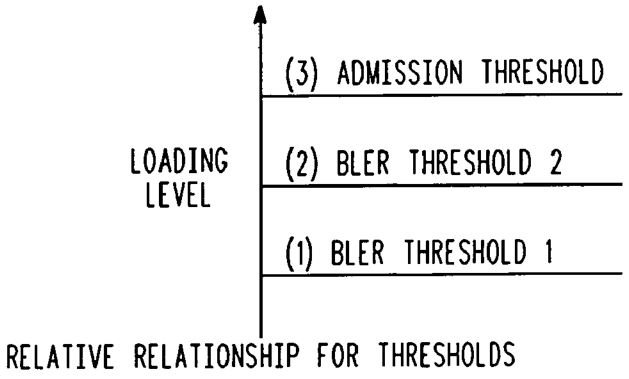
FIG. 3 is a loading level diagram illustrating portions of an exemplary set of relative relationship for thresholds utilized in controlling throughput in accordance with various exemplary embodiments.

Referring now to FIG. 3, an exemplary relative relationship for thresholds used in connection with dynamic control of QoS (quality of service) and capacity will be discussed and described. FIG. 3 is a loading level diagram illustrating portions of an exemplary set of relative relationships for thresholds utilized in controlling throughput in accordance with various exemplary embodiments. As is illustrated, a loading level at a cell can be monitored for increases and decreases in relation to various BLER (block error rate) thresholds 1, 2 and an admission threshold 3. In the present example, there are provided two BLER thresholds 1, 2, although alternative exemplary embodiments can incorporate more or fewer thresholds. Moreover, although capacity is monitored with respect to BLER thresholds, alternative exemplary embodiments can provide an alternative measure of performance to be monitored. In the present example, the admission threshold 3 can define an optional maximum limit for number of users, such that e.g., a new user will not be admitted if the limit is exceeded. The current load level in the cell can be monitored and/or detected, for example in relation to various thresholds. As conditions change in the cell, the thresholds may be approached or passed, and the bearer configuration can be altered to decrease or increase capacity, as further described herein. For example, BLER can be changed in the bearer configuration, which can cause a change in the available capacity.

Figure 4:
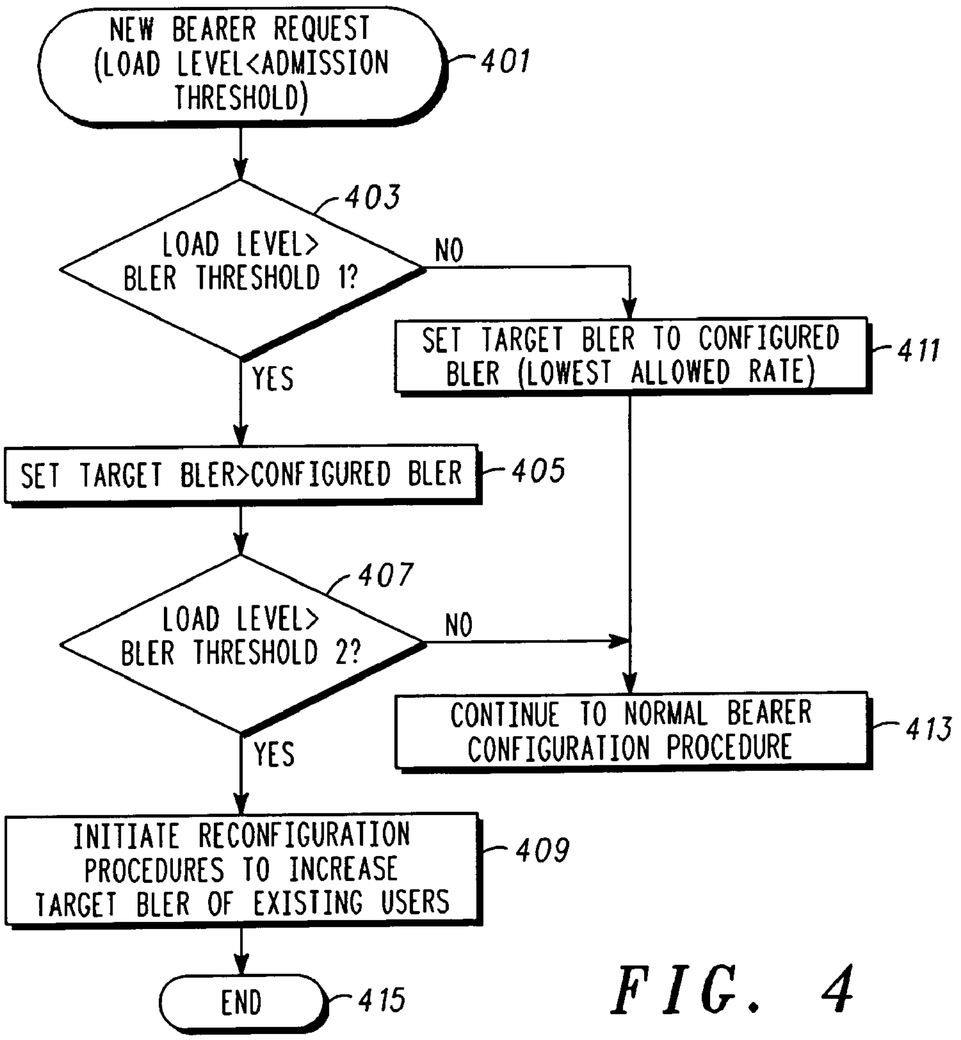
FIG. 4 is a flow chart illustrating an exemplary procedure for handling a new bearer request in accordance with various exemplary embodiments.

Referring now to FIG. 4, an exemplary procedure for processing a new bearer request will be discussed and described. FIG. 4 is a flow chart illustrating an exemplary procedure for handling a new bearer request 401 in accordance with various exemplary embodiments. The procedure can advantageously be implemented on, for example, a processor of a controller, described in connection with FIG. 2 or other apparatus appropriately arranged.

In accordance with the illustrated exemplary embodiment, a new bearer request is received 401. For example, a mobile cellular telephone can initiate a call over a network, thereby causing the new bearer request. In the present example, the new bearer request can be admitted, since the current load level is below the optional admission threshold. The determination of current load level can be made in accordance with conventional procedures. The optional admission threshold can be provided as a configured parameter, for example.

The procedure provides for determining 403 whether the current load level exceeds a first threshold, e.g., a first BLER threshold. If not, then the procedure can set 411 the target value to a configured value, e.g., sets a target BLER to a configured BLER, where the configured value (e.g., BLER) optionally corresponds to a lowest value (e.g., lowest BLER, to permit the fewest block errors) allowed by an operator. The procedure can continue 413 to a bearer configuration procedure, e.g., a conventional radio bearer configuration procedure, wherein the configured value (e.g., configured BLER) can be utilized to modify the bearer configuration.

On the other hand, if 403 the current load level exceeds a first threshold, e.g., the first BLER threshold, in accordance with one or more embodiments, then the target value, e.g., the target BLER, is incrementally increased, for example, by a pre-configured BLER rate of change (see additional description below). For example, the target BLER can be set 405 to be greater than the configured BLER. In this instance, the target value, e.g., the target BLER, can be worse than the normal or ideal rate allowed by the operator, but still within acceptable tolerances.

Then, if the current load level 407 is not greater than a second threshold, e.g., a second BLER threshold, the procedure can continue 413 to a bearer configuration procedure, described previously, wherein the target value, e.g., the target BLER for this user or new bearer, is utilized for the otherwise normal bearer configuration.

If the current load level 407 is greater than the second threshold, e.g., the second BLER threshold, which in the present example is the maximum allowed target BLER threshold, the procedure can initiate 409 reconfiguration procedures to increase the target value, e.g., the target BLER, of existing users. The reconfiguration procedure can be performed in accordance with known techniques. After 409 or 413 processing then ends 415, however the process may be repeated as required, e.g. with another bearer request.

Figure 5:
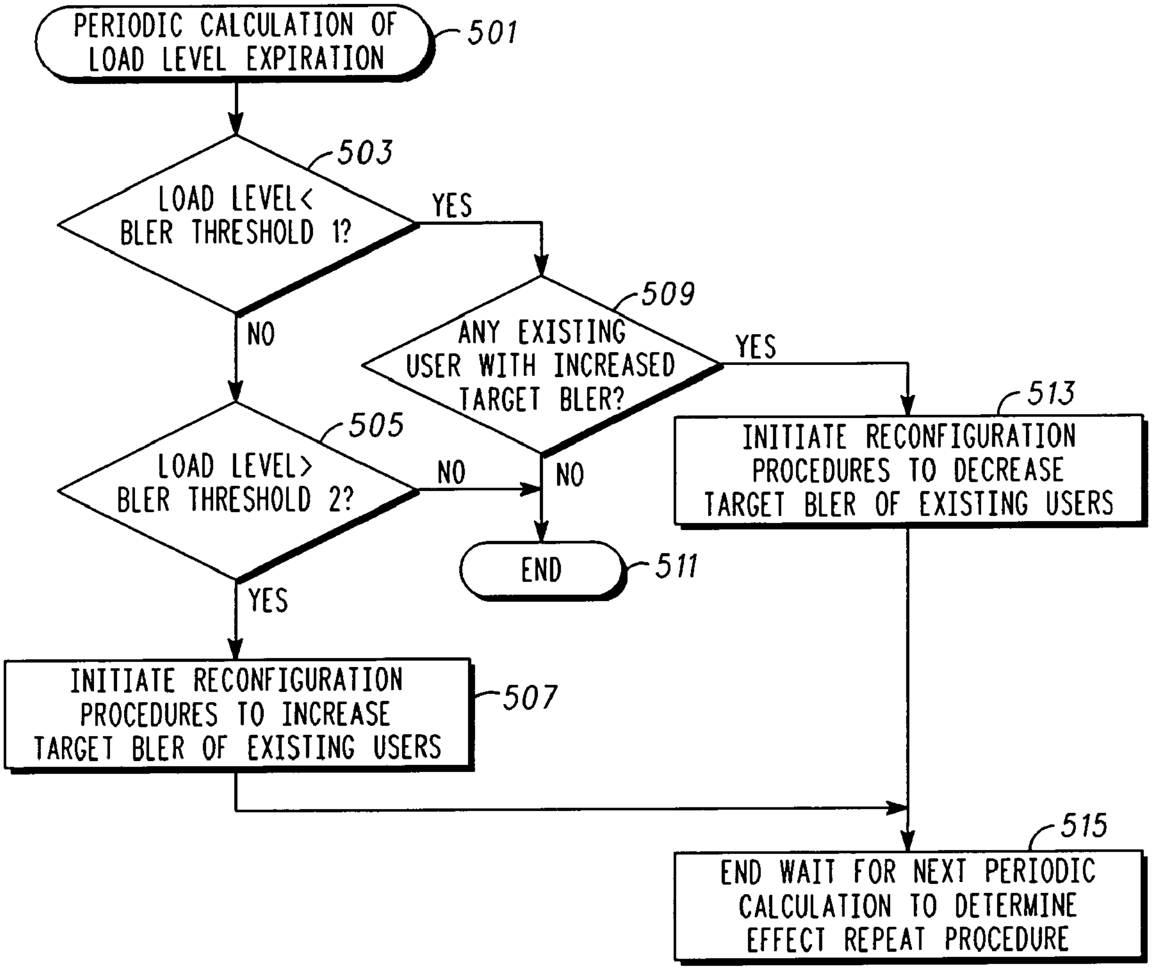
FIG. 5 is a flow chart illustrating an exemplary procedure for handling a periodic calculation/evaluation of load level.

Referring now to FIG. 5, an exemplary procedure for periodically evaluation/calculation of load level will be discussed and described. FIG. 5 is a flow chart illustrating an exemplary procedure for handling a periodic calculation of load level and corresponding target BLER adjustments. The procedure can advantageously be implemented on, for example, the processor of the controller, described in connection with FIG. 2 or other suitably configured apparatus.

In accordance with the illustrated exemplary embodiment, a time 501 for a periodic calculation of a load level has expired. In this way, current loading is monitored so that adjustments can be made as conditions change rather than, for example, awaiting a new user request or other activity on the communication network. The determination of current load level can be made in accordance with conventional procedures. The exemplary embodiment again utilizes BLER for illustration purposes.

The procedure provides for determining 503 whether the current load level is less than the first threshold, e.g., the first BLER threshold. If so, then the procedure determines 509 whether there is any existing user with an increased target value corresponding to the threshold, e.g., an increased target BLER. If no existing user has an increased target value, e.g., the target BLER, then processing ends 511. If one or more existing users do have a corresponding increased target value, e.g., the target BLER, then the procedure can initiate 513 reconfiguration procedures to decrease the target value, e.g., the target BLER, of the one or more existing users. The reconfiguration procedure can be performed in accordance with known techniques. Processing then ends 515, and awaits the next periodic calculation, for example, to determine the effect of the processing 513 and to repeat the procedure of FIG. 5.

On the other hand, if 503 the current load level is not below i.e. exceeds the first threshold, e.g., the first BLER threshold, in accordance with one or more embodiments, then it is determined 505 whether the current load level is greater than the second threshold, e.g., the second BLER threshold. If the current load level is not greater than the second threshold, e.g., the second BLER threshold, processing ends 511.

If 505 the current load level is greater than the second threshold, e.g., the second BLER threshold, the procedure can initiate 507 reconfiguration procedures to increase the target value, e.g., the target BLER of existing users. The reconfiguration procedure can be performed in accordance with known techniques. Processing then ends 515, and awaits the next periodic calculation, for example, to determine the effect of the processing and to repeat the procedure of FIG. 5.

EXAMPLE 1

Target BLER Value Determination

The following section provides an example utilizing BLER for illustration purposes, wherein new target BLER values are determined based on a load level calculation. (Note: "*" throughout this example indicates a value that can be preconfigured in a database storing information utilized by the calculation.)

Conventional Parameter Derived from Internal System Calculation:

Load Level=Calculated measure of cell load used for admission control purposes.

Conventional Operator Configurable Parameters:

Admission Threshold*=Configurable loading level threshold used for decision on admitting new users.

Configured BLER*=BLER Target from database. Acts as lowest BLER target to be used for this service type.

Exemplary Operator Configurable Parameters in Accordance with One or More Embodiments:

BLER_Thresh_1*=Configurable Loading Level threshold used to determine BLER target for current pending user.

BLER_Thresh_2*=Configurable Loading Level threshold used to determine BLER target for existing users.

BLER Rate of change*=One or more parameters optionally used to control a rate of BLER target increase/decrease, e.g., amount of change over time.

Reconfig Group Size*=Set of parameters used to control number of users to be reconfigured during a reconfiguration process, as described above.

Calculation Process Output

Target BLER=BLER Target to be actively used by power control procedures for a particular user.

The following section describes an exemplary target BLER calculation, and provides three exemplary calculations, used in accordance with one or more exemplary and alternative exemplary embodiments.

The exemplary target BLER calculation causes a target BLER to be calculated, for example to either improve the throughput per user when the utilized capacity of a portion of the communication network is low, or to reduce the user throughput when capacity called for by the users on a portion of the communication network is high. With reference to FIG. 4 and FIG. 5 above, for example processes 405 and 507 can reduce the throughput per user (e.g., by increasing target BLER), and in FIG. 5, process 513 can improve throughput per user (e.g., by decreasing target BLER). A mechanism for adjusting the target BLER can utilize preconfigured parameters, e.g., determined through interaction of the system with an operator, to specify an increment step size and a decrement step size for the target BLER (e.g., target_BLER_inc* and target_BLER_dec*). The reconfigured group size can specify the number of users to be adjusted as a group during any single reconfiguration procedure (e.g., BLER_reconfig_size*).

$$\text{Target\_}BLER\text{=Configured\_}BLER\text{*+target\_}BLER\text{\_}inc\text{*} \quad (1)$$

The foregoing calculation can increase the configured BLER by the preconfigured increment value, in order to reduce throughput and increase capacity capability. This can be used in one or more embodiments, for example, on initial receipt of a bearer request (e.g., FIG. 4).

$$\text{Target\_}BLER(n)\text{=Configured\_}BLER\text{*+target\_}BLER\text{\_}inc\text{*} \quad (2)$$

(for n<=BLER_reconfig_size*)

For the dynamic modification of active users (e.g., FIG. 5, discussed above), equation (1) can be repeated for the preconfigured number of users.

$$\text{Target\_}BLER_{new}(n)\text{=MAX((Target\_}BLER_{present}(n)\text{–target\_}BLER\text{\_}dec\text{*), Configured\_}BLER\text{*)} \quad (3)$$

(for n<=BLER_reconfig_size*)

For the dynamic modification of active users (e.g., FIG. 5, discussed above), the new target_BLER can be set for the preconfigured number of users. The BLER target currently being used can be decreased by the preconfigured decrement value to increase throughput and take advantage of low traffic in the cell. In accordance with one or more embodiments, the new target_BLER can be limited to remain above the predetermined limit specified in Configured_BLER*.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A controller providing dynamic capacity for use in connection with a communication network, comprising:

a processor, configured to facilitate first determining whether a current load level is below a predetermined low usage, and responsive thereto, first adjusting a target block error rate and a quality of service parameter to allow higher throughput per user; and to facilitate second determining whether the current load level exceeds a predetermined high usage, and responsive thereto, second adjusting the target block error rate and the quality of service parameter to allow lower throughput per user.

2. The controller of claim 1, wherein the processor is configured to facilitate at least one of the first adjusting and the second adjusting according to at least one quality of service parameter.

3. The controller of claim 1, wherein the processor is configured to facilitate at least one of the first adjusting and the second adjusting performed according to a block error rate.

4. The controller of claim 1, further comprising a transceiver for receiving signals when operably connected to a communication network, wherein the processor is configured to facilitate at least one of the first determining and the second determining responsive to a receipt of a bearer request signals.

5. The controller of claim 1, wherein the processor is configured to facilitate monitoring the current load level, and to facilitate at least one of the first determining and the second determining responsive to the monitoring.

6. The controller of claim 1, wherein the communication network includes at least one radio network controller, and wherein the quality of service parameter is adjusted for the radio network controller corresponding to a new bearer thereon.

7. The controller of claim 1, wherein the higher throughput per user corresponds to a lowest pre-determined block error rate.

8. The controller of claim 1, further comprising calculating the target block error rate, wherein the lower throughput per user corresponds to the target block error rate.

9. A method for providing dynamic capacity in a communication network, comprising:

first determining whether a current load level is below a predetermined low usage, and responsive thereto, first adjusting a target block error rate and a quality of service parameter to allow higher throughput per user; and second determining whether the current load level exceeds a predetermined high usage, and responsive thereto, second adjusting the target block error rate and the quality of service parameter to allow lower throughput per user.

10. The method of claim 9, wherein at least one of the first adjusting and the second adjusting is performed according to at least one quality of service parameter.

11. The method of claim 9, wherein at least one of the first adjusting and the second adjusting is performed according to a block error rate.

12. The method of claim 9, wherein at least one of the first determining and the second determining is performed responsive to a receipt of a bearer request.

13. The method of claim 9, wherein at least one of the first determining and the second determining is performed periodically.

14. The method of claim 9, wherein at least one of the first determining and second determining is performed in a processor of a radio network controller.

15. The method of claim 9, wherein the higher throughput per user corresponds to a pre-determined block error rate.

16. The method of claim 9, further comprising calculating the target block error rate, wherein the lower throughput per user corresponds to the target block error rate.

* * * * *